United States Patent [19]
Arguilez

[11] 4,427,545
[45] Jan. 24, 1984

[54] DUAL FUEL FILTER SYSTEM
[76] Inventor: Arcadio C. Arguilez, 1302 Carol Pl., National City, Calif. 92050
[21] Appl. No.: 449,295
[22] Filed: Dec. 13, 1982
[51] Int. Cl.³ .................. B01D 23/24; B01D 29/38; B01D 35/02
[52] U.S. Cl. .................. 210/333.1; 210/416.4; 210/392
[58] Field of Search ............ 210/168, 416.4, 416.5, 210/DIG. 17, DIG. 13, 392, 393, 493.1, 108, 322, 323.1, 333.01, 333.1; 137/256, 262, 265

[56] References Cited
U.S. PATENT DOCUMENTS

| 2,302,552 | 11/1942 | Johnson | 210/168 |
| 2,425,700 | 8/1947 | Le Clair | 210/168 |
| 2,843,268 | 7/1958 | Kennedy | 210/DIG. 13 |
| 2,979,160 | 4/1961 | Haas | 210/DIG. 13 |
| 3,291,562 | 12/1966 | Anderson | 210/253 |
| 3,380,591 | 4/1968 | Muller | 210/333.1 |
| 3,679,060 | 7/1972 | Smith | 210/333.1 |
| 3,770,623 | 11/1973 | Seidel | 210/253 |
| 3,848,633 | 11/1974 | Hurtig et al. | 137/262 |
| 4,129,429 | 12/1978 | Humbert et al. | 210/493.1 |

Primary Examiner—Charles N. Hart
Assistant Examiner—Wanda L. Millard
Attorney, Agent, or Firm—Ralph S. Branscomb

[57] ABSTRACT

A fuel filter is provided for internal combustion engines and particularly for diesel engines utilizing a dual filter zone arrangement fed by two separate fuel supply lines, each of these lines being valved to operate in an open mode in which fuel is pumped freely from the fuel tank into the filter zone, and a dump mode, wherein reverse-flow fuel delivered from the other filter zone backwashes the dumping filter zone to purge the filter elements of accumulated particulates.

1 Claim, 4 Drawing Figures

DUAL FUEL FILTER SYSTEM

BACKGROUND OF THE INVENTION

Particulate impurities in fuel are known to be the cause of engine breakdowns and wear problems, particularly with the diesel. A diesel fuel filter, after it is covered with dirt and grit, may stop passing fuel altogether, causing the engine to stop. Also, eventually some of the grit may somehow work its way through the filter, and do considerable damage to the diesel injectors.

There is a need therefore for a fuel system which can be switched from one filtering zone to another so that the engine can be run while one of the filter zones is clogged, and also there is a need for a system which is easily purged and backwashed without requiring the replacement of filter elements.

SUMMARY OF THE INVENTION

The present invention fulfills the above-stated needs by providing a dual filter zone arrangement, each zone being separately fed by a fuel supply line. The filter zones deliver fuel downstream into a common outlet passageway, so in the event that one of the valves in one of the fuel supply lines is turned into the dump mode, it will be fed fuel passing backwards through the respective filter elements to purge the filter.

The same valves which can be used to alternatively dump the two fuel zones may also have a third mode of operation in which they are shut off, to permit only one fuel zone to be operative at a time. The advantage of this lies in the fact that this way, only one zone will become clogged, and the system can be switched over to the other filter zone.

DETAILED DESCRIPTION OF THE PREFERRED EMBODIMENTS

Figure 1:
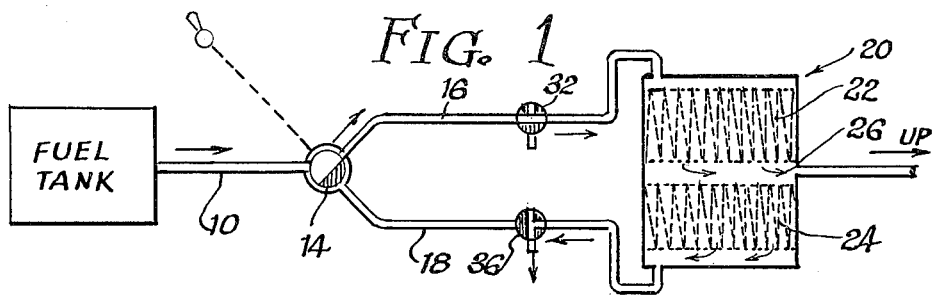
FIG. 1 is a diagrammatic view of the filter system.
Figure 3:
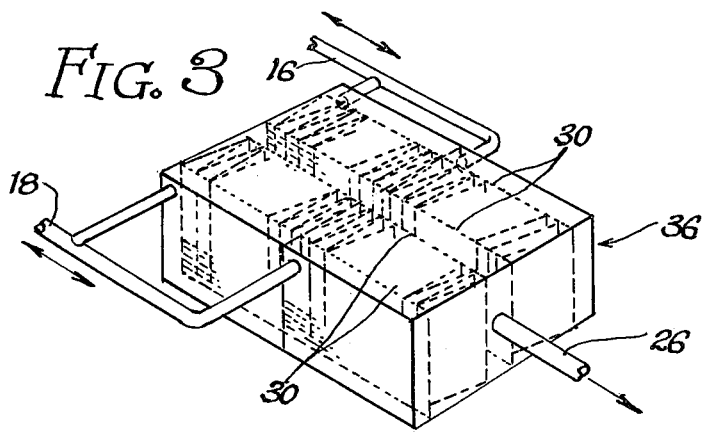
FIG. 3 is a perspective view of the filter itself showing elements in phantom.
Figure 4:
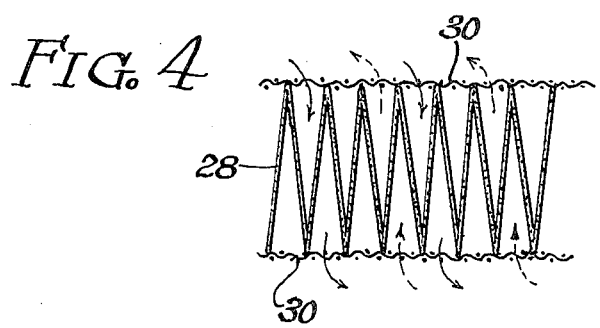
FIG. 4 is a typical horizontal section through the accordian filter elements and the screens which hold it in place.

Fuel is supplied from the main fuel tank through the pump along the main supply line 10, to the junction 12. This junction may be a straight T-connection, but in the preferred embodiments there is a valve 14 at this junction which can deliver fuel from the main supply line either upwardly into the first filter supply line 16, down into the second filter supply line 18, or to both the supply lines at once. In the embodiment of FIG. 1, the filter container 20 comprises a first zone 22 and a second zone 24, both of which discharge into a common outlet passageway 26. The fuel is passed through accordian-like filter elements 28, best seen in FIGS. 3 and 4, which are restrained between parallel screens 30. Alternatively, the filters could be permanently secured with an adhesive or cement, and the filter sold as a sealed unit, with the backflushing being relied upon to completely clean the filters without replacement.

Disposed in the filter supply lines 16 and 18 are valves 32 and 34. These valves have at least two modes of operation, the open mode illustrated by valve 32, and the dump mode illustrated by valve 34. Because the two filter zones communicate through the discharge passageway 26, when the valves are in their position shown in FIG. 2, filter zone 22 will discharge some of its fuel through the second zone 24 backwards, thereby backwashing the filter elements and discharging the accumulated particulate matter through the valve 34. The end of the filter on the right in the drawings is actually up, so that sludge will graviate to the bottom of the respective zones where the discharge pipes are connected.

Figure 2:
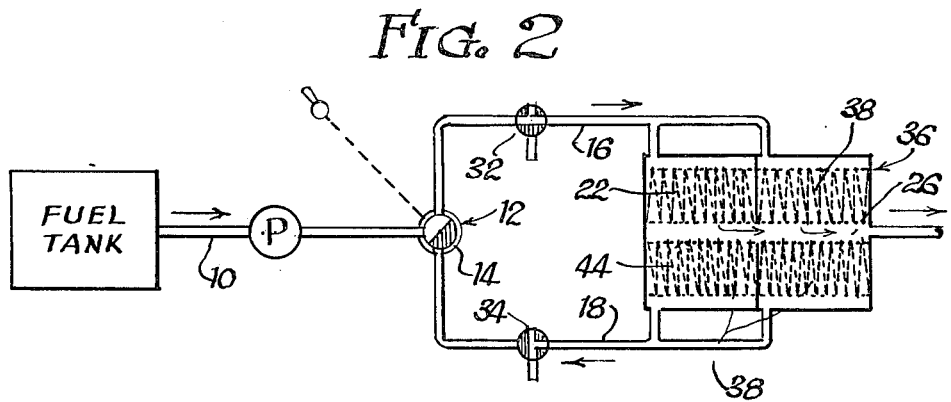
FIG. 2 is a diagrammatic view of a slightly modified system.

The embodiment of FIG. 2 differs from that of FIG. 1 in that the filter container 36 is divided into four compartments 38 rather than just 2 in FIG. 1, and each compartment is fueled separately by its branch from the filter supply line. This approach tends to channel the fuel better and maximize the filtering area.

The filter containers themselves can be made in any conventional matter, probably being welded sheet metal, with a removable, gasketed top to provide access for the occasional maintenance that might be necessary and possible replacement of damaged filter elements. Because of the discharge and purging capabilities of the system, however, it is anticipated that access to the interior of the filter, and replacement of the filter elements, might be a rare occurence.

While the preferred embodiments of the invention have been described, other modifications may be made thereto and other embodiments may be devised within the spirit of the invention and scope of the appended claims.

What is claimed is:

1. A fuel filter comprising:
 (a) a main fuel supply line having a pump therein;
 (b) a junction in said main supply line downstream of said pump branching off into a first and second filter supply line;
 (c) a valve at said junction capable of directing fuel alternatively to said first or second fuel supply line;
 (d) a first and second filter zone fueled by said first and second fuel supply lines, respectively;
 (e) a sealed filter container housing said first and second filter zones and defining with said filter zones a common filtered fuel area downstream of both of said filter zones;
 (f) a filtered fuel takeoff system downstream of said filter zones communicating with said common filtered fuel area; and
 (g) a dump valve in each of said first and second fuel lines, each dump valve having an open mode permitting free fuel flow in the respective line, and a dump mode in which the supply line on the upstream side of the valve is shut off and the supply line on the downstream side of the respective valve communicates with a dump opening, whereby either of said dump valves can be set in the dump mode with the other dump valve in the open mode, and the filter downstream of the respective dump valve in the dump mode will be flushed.

* * * * *